United States Patent [19]

Scallan

[11] Patent Number: 4,708,164
[45] Date of Patent: Nov. 24, 1987

[54] SAFETY RELIEF VALVE

[75] Inventor: David J. Scallan, Pineville, La.

[73] Assignee: Dresser Industries, Inc., Dallas, Tex.

[21] Appl. No.: 874,921

[22] Filed: Jun. 16, 1986

[51] Int. Cl.[4] ............................................. F16K 17/20
[52] U.S. Cl. .................................. 137/476; 137/477;
137/478
[58] Field of Search ....................... 137/476, 477, 478

[56] References Cited

U.S. PATENT DOCUMENTS

| | | | |
|---|---|---|---|
| 630,826 | 8/1899 | Downs | 137/478 O |
| 1,231,330 | 6/1917 | Clark | 137/478 |
| 1,233,752 | 7/1917 | Clark | 137/478 |
| 1,696,452 | 12/1928 | Raymond | 137/477 |
| 2,261,461 | 11/1941 | Falls | 137/478 |
| 2,821,208 | 6/1958 | Farris | 137/428 |
| 3,354,900 | 11/1967 | Ferrill | 137/478 X |
| 3,406,712 | 10/1968 | Weise | 137/477 X |
| 3,572,372 | 3/1971 | Moore | 137/478 X |
| 3,897,802 | 8/1979 | Bass | 137/428 |

Primary Examiner—Harold W. Weakley

[57] ABSTRACT

An improved safety relief valve that includes an adjusting ring located on the valve seat member. The adjusting ring has one end located to provide an orifice which will control the area governing the rate of closure or "blow down" of the valve and a much larger peripheral surface which cooperates with a valve member carrier to provide an orifice that governs the force applied to the valve carrier and valve member to lift the valve which has been previously "cracked."

1 Claim, 4 Drawing Figures

SAFETY RELIEF VALVE

BACKGROUND OF THE INVENTION

This invention relates generally to safety valves for relieving pressure above a predetermined value. More particularly, but not by way of limitation, this invention relates to an improved safety relief valve including an orifice forming member that permits rapid valve opening at low pressures above the preset opening value, stability of the valve when open, and permits rapid closure of the valve as the pressure drops toward the preset opening value.

In the design of safety relief valves, it is highly desirable to provide a valve wherein the valve cracks at the preset pressure and moves rapidly at low pressure increases to the full opening position of the valve, is stable at such positions, and one that will snap closed as the pressure in the valve drops. It is also highly desirable to provide a valve wherein the flow area therethrough is such that the movement of the valve member away from the seat can be as small as possible to avoid early fatigue of the spring which moves the valve member toward the seat. Difficulty has also been encountered when the valve member is off of the seat due to an unstable condition which is frequently referred to as "chatter". Such "chatter" can cause early destruction of the valve seat preventing the complete closure of the valve.

One attempt to alleviate such problems is illustrated in U.S. Pat. No. 4,130,130 issued Dec. 19, 1978 to Robert D. Stewart et al. In that valve, there is provided an adjustable annular member that encircles an annular valve seat. The adjustable annular member or ring cooperates with a flange on a valve member carrier to form an orifice which controls the rate of opening and of closing of the valve. It can be seen in the patent that the diameter of the ring is relatively small where the orifice is formed and thus a relatively large force and relatively large lift is required on the valve to provide opening and full flow. Such an arrangement will provide stability and rapid closure of the valve when the pressure in the inlet decreases, but has the disadvantages mentioned above.

SUMMARY OF THE INVENTION

The object of this invention is to provide an improved safety release valve having an orifice forming member therein which provides a relatively large area effective after cracking of the valve so that stability and maximum flow area is provided with minimum lift. Simultaneously, the valve provides a second orifice of relatively small size which permits rapid closure of the valve as the pressure in the valve decreases.

Accordingly, this invention provides an improved safety release valve that includes a hollow valve body having a fluid inlet, a fluid outlet, a valve seat encircling the inlet, a valve member movable toward and away from the seat, adjustable means biasing the valve member into sealing engagement with the seat until the fluid pressure in the inlet exceeds a predetermined value and a valve member carrier having a downwardly projecting peripheral flange. The improvement comprises an orifice forming member on the valve seat that includes an outer peripheral portion sized to fit closely within the flange on the valve member carrier and to form a variable orifice therewith and an axially projecting annular portion that extends toward the valve member carrier and forms a second orifice with the valve carrier member.

In another aspect, this invention contemplates a method of stabilizing and closing a safety release valve that has a spring loaded valve member therein that is movable in response to a predetermined pressure. The method comprises the steps of restricting flow through the valve after initial opening by the use of a first orifice whereby fluid pressure is applied to a relatively large area lifting and holding the valve member off the valve seat; and, restricting flow through the valve by the use of a second orifice as pressure in the valve drops toward the predetermined value whereby the pressure acts on a smaller area of the valve member, reducing the pressure force thereon and permitting the spring loaded valve member to close rapidly.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
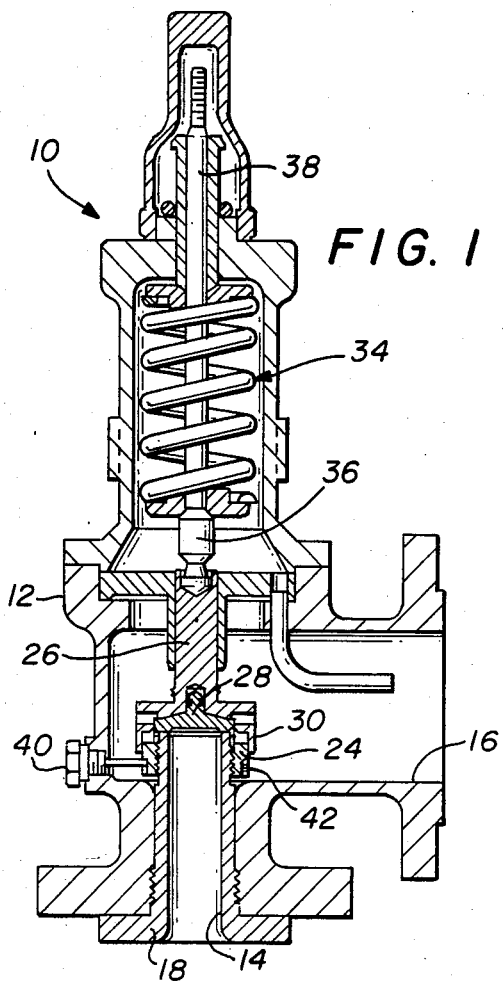
FIG. 1 is a cross-sectional view of a safety relief valve that is constructed in accordance with the invention.

Referring to the drawing and to FIG. 1 in particular, shown therein and generally designated by the reference character 10 is a safety relief valve that is constructed in accordance with the invention. As illustrated, the valve 10 includes a hollow body 12 having an inlet 14 and an outlet 16 permitting the flow of fluid therethrough.

Mounted within the inlet 14 of the valve 10 is a valve seat member 18 having an annular valve seat 20 (see FIGS. 3 and 4) located on the upper end thereof. The exterior of the valve seat member 18 is provided with a thread 22 for adjustably receiving an orifice forming member or ring 24.

A valve carrier 26 carries a valve member 28 that is arranged for sealing engagement with the annular valve seat 20. The valve carrier member 26 includes a downwardly projecting flange 30 which forms a cavity and an annular surface 32 within the carrier member 26. It will be noted that the flange 30 overlaps the ring 24 when the valve 10 is in the closed position as illustrated in FIG. 1.

The valve carrier member 26 is in engagement with a spring assembly 34 which through a valve actuating rod 36, exerts a force on the carrier member 26 biasing the valve member 28 toward the closed position of the valve 10. An adjusting mechanism 38 is located in the valve 10 to provide for adjustment of the amount of force exerted by the spring assembly 34. The adjusting mechanism 38 will not be described in detail in view of the well known nature of its construction and the various types of systems that are available.

As previously mentioned, the ring 24 is adjustable on the valve seat member 18. This is accomplished by rotating the ring 24 on the threads 22. To prevent inadvertent movement of the ring 24, there is provided a locking member 40 that extends through the valve housing 12 engaging slots 42 formed in the lower end of the ring 24.

The ring 24 includes a relatively small upper end portion 44 projecting axially toward the surface 32. The end portion 44 can be located very close to the surface 32 of the valve carrier member 26 when the valve 10 is in the closed position. Thus, the end 44 forms an annular orifice 46 with the surface 32. The purpose of the orifice 46 will be explained more fully in the discussion of the operation of the valve 10.

The ring 24 also includes an enlarged diameter portion forming an outer periphery 48 which, in conjunction with the flange 30 on the carrier 26, forms a second orifice 50 (see FIG. 2) for purposes that will also be explained more fully in connection with the operation of the valve 10. It will be noted that the upper end of the peripheral portion 48 of the ring 24 is provided with a rounded edge or surface 52 which operates in conjunction with the flange 30 to vary the radial size of the orifice 50 as the carrier 26 moves upwardly during opening of the valve 10.

OPERATION OF THE PREFERRED EMBODIMENT

The valve 10 will be mounted on an appropriate fitting so that fluid (liquid) which is to be controlled is present in the inlet 14. The outlet 16 is connected with conduits leading to a drain or to other vessels, depending on the circumstances of use. In any event, the pressure in the outlet 16 is substantially lower than that in the inlet 14 and generally is atmospheric.

Figure 2:
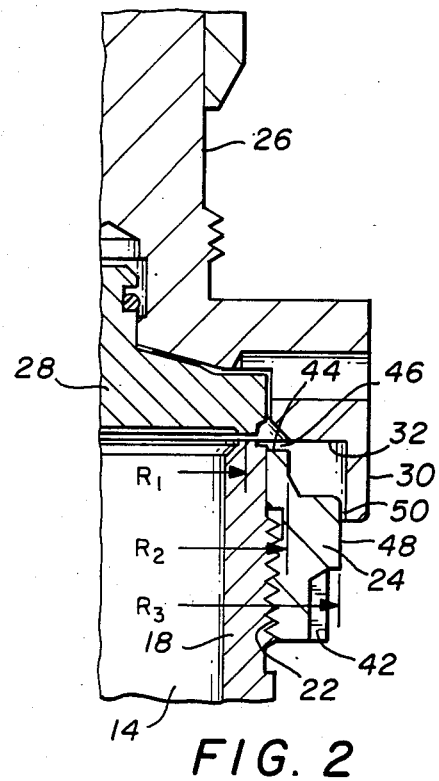
FIG. 2 is an enlarged fragmentary cross section of a portion of the valve of FIG. 1 illustrating the valve carrier member, valve disc, valve seat and orifice forming member in one operating position.

The spring assembly 34 is set to exert the proper loading or biasing force on the valve carrier 26 so that the compressive force required on the spring to initially open or "crack" the valve 10 is of the predetermined value. The cracking force is generated by pressure in the inlet times an area that is determined by the radius R1. As soon as the valve is cracked as illustrated in FIG. 2, fluid in the inlet 14 flows past the valve seat 20 into the cavity of the carrier 26 as defined by the flange 30.

The lifting force applied to the valve carrier 26 by the fluid pressure is caused by the restriction of the orifice 50, and thus the lifting force is determined by the pressure in the inlet 14 times an area that is determined by the radius R3. Accordingly, it can be seen that the valve is opened rapidly with the valve member 28 and valve carrier 26 driven upwardly as a result of the force just mentioned. The valve will rapidly move from the FIG. 2 position to the FIG. 4 position wherein full flow will occur through the orifice 50 due to the application of the pressure to the greater area of the cavity in the carrier 26.

As the carrier 26 moves upwardly, it will be noted that the flange 30 is disposed adjacent to and passes the rounded edge 52 and thus the orifice 50 increases rather rapidly and nonlinearly to provide for a greater flow rate. During this stage of the operation, it will be appreciated that the force generated by the pressure is substantially greater than that initially cracking the valve so that the valve member 28 is lifted and held clear of the valve seat 20 to prevent valve chatter.

Valve chatter, which occurs when the valve member 28 repeatedly engages the valve seat 20, is one of the causes of failure or leaking in safety relief valves. Thus, the valve 10 will be operable for an extended period of time since valve chatter is avoidable.

Figure 3:
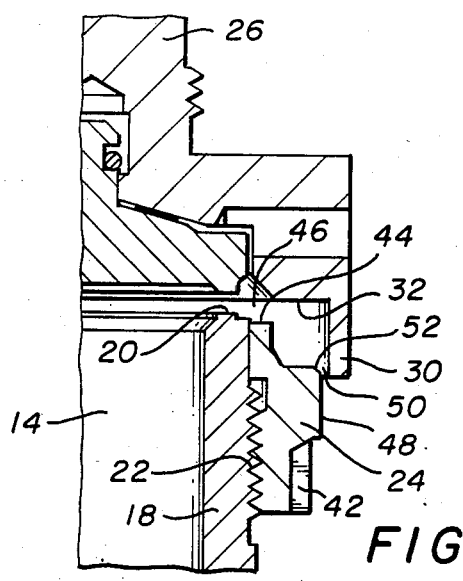
FIG. 3 is a view similar to FIG. 2 but illustrating the valve components in another operating position.
Figure 4:
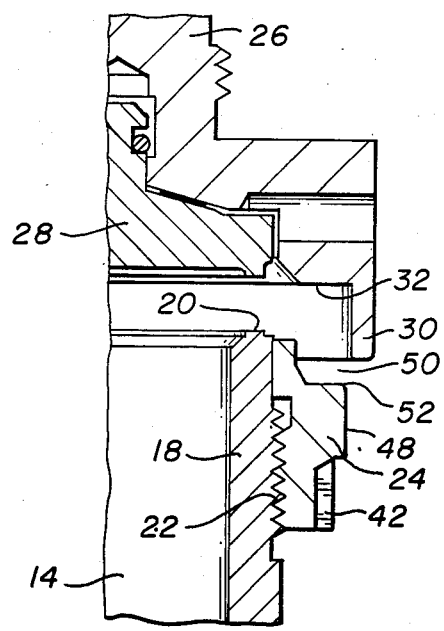
FIG. 4 is a view similar to FIG. 2 but illustrating the valve components in still another operating position.

From the foregoing, it can be seen that the orifice 50 which is initially of long cylindrical configuration and provides maximum restriction of flow at cracking, increases rapidly in size as illustrated in FIGS. 3 and 4 to provide maximum flow area through the valve 10 while lifting the valve carrier 26 and valve member 28 against the spring assembly 34 for the least possible distance, thus prolonging spring life.

As the pressure in the inlet 14 begins to drop, the valve carrier 26 and valve member 28 start moving toward the valve seat 20 under the influence of the spring assembly 34. In any of the relief valves, the valve member 28 returns into sealing engagement with the seat 20 when the pressure in the inlet 14 drops below the pressure necessary to generate the cracking force. This is often a relatively long period of time and perhaps a period of instability. To overcome this difficulty, the ring 24 can be adjusted upwardly on the seat member 18 until the end 44 thereon provides a relatively small orifice 46 between the end 44 and the surface 32. As the valve member and valve carrier 26 move downwardly toward the seat 20, the orifice 46 becomes small as illustrated in FIG. 2, restricting flow therethrough. Because of the relatively low flow with the pressure dropping in the inlet 14, the force holding the carrier 26 and valve member 28 off the seat 20 is generated by the pressure in the inlet times an area determined by the radius R2 illustrated in FIG. 2. Since this force is substantially less than the lifting force generated by the restriction of the orifice 50, the spring assembly 34 easily overcomes the force and drives the valve member 28 into tight sealing engagement with the valve seat 20 closing the valve very rapidly. The rapidity of closure can be adjusted by adjusting the position of the ring 24.

Accordingly, it will be appreciated from the foregoing description that the invention provides: an improved safety relief valve in which the force necessary for cracking the valve is determined by the pressure in the inlet 14 times an area that is very small (radius $R_1$); a valve in which the lifting force is determined by a large area (radius $R_3$) so that the valve is lifted very quickly off the seat and remains stable when lifted; and a valve in which the closing or "blow down" is varied by adjusting the position of the ring 24 so that if a very quick snap closing is desired, the force opposing closure is determined by an intermediate area (radius $R_2$).

It will be understood that the foregoing detailed description is presented by way of example only, and that many changes and modifications can be made thereto without departing from the spirit or scope of the invention.

What is claimed is:

1. An improved safety relief valve including a hollow valve body having a fluid inlet, a fluid outlet, a valve seat encircling said inlet, a valve member movable toward and away from said seat defining a cracking area when in engagement with said seat, adjustable means biasing said valve member into sealing engagement with said seat until the fluid pressure in said inlet exceeds a predetermined value, and a valve member carrier having a downwardly projecting peripheral flange having a lower end and providing a cylindrical interior, the improvement comprising orifice forming means on said valve seat, said orifice forming means including:

an annular member moveably located on said seat;

a cylindrical outer peripheral surface on said annular member sized to fit closely and concentrically within the cylindrical interior of the flange of said valve member carrier and always disposed within the lower end of said flange when said valve member is in engagement with said seat forming a substantially constant area, variable length orifice therewith when said valve member is in engagement with or relatively close to said seat defining a lift area that is substantially larger than said cracking area;

a radiused end surface on said outer peripheral surface forming a variable area orifice with the end of said flange when said valve member is located remote from said seat, whereby a large volume flow area change occurs upon slight movement of said valve member relative to said orifice forming means;

an axially projecting annular portion smaller in diameter than said outer peripheral surface extending toward said valve member and forming a second orifice with said valve carrier member defining a closing area of a size between said cracking area and said lift area; and, a locking member extending into said valve body and engaging said annular member for permitting and preventing rotation of said annular member on said seat.

* * * * *